United States Patent

[11] 3,633,971

[72] Inventors Richard K. Berky
Cedar Falls, Iowa;
Edgar J. Rickel, Leawood, Kans.
[21] Appl. No. 846,449
[22] Filed July 31, 1969
[45] Patented Jan. 11, 1972
[73] Assignee Rickel, Inc.
Kansas City, Mo.

[54] HYDRAULIC DUMP BOX
3 Claims, 6 Drawing Figs.

[52] U.S. Cl. .................................... 298/10,
214/313, 298/11, 298/17.5
[51] Int. Cl. .................................... B65g 67/50
[50] Field of Search .......................... 298/10-14,
17 R, 18, 7, 9, 17.5, 22 R, 23 R; 214/313

[56] References Cited
UNITED STATES PATENTS
2,929,658  3/1960  Killebrew ................... 298/10 X
617,994   1/1899  Richardson ................. 298/10 X
2,424,670  7/1947  Shimer ...................... 298/10 X
3,193,150  7/1965  Simas ....................... 298/10 X
3,205,011  9/1965  Diem ........................ 298/10
3,409,328  11/1968 Hamby et al. ............... 298/10 X
FOREIGN PATENTS
863,895   3/1961  Great Britain .............. 298/11

Primary Examiner—Milton Buchler
Assistant Examiner—F. K. Yee
Attorney—Scofield, Kokjer, Scofield & Lowe ABSTRACT: A side dump box apparatus for mounting on a truck bed. Forced by a hydraulic cylinder, an open-topped container with a hinged dumping spout is tilted outwardly from the truck bed on a supporting frame pivotally connected to a fixed base. The container, which is pivotally connected to the supporting frame, then is rotated upwardly above said frame in order to dump its contents.

PATENTED JAN 11 1972

INVENTOR
Richard K. Berky
Edgar J. Rickel

BY Scofield, Kokjer, Scofield & Lowe
ATTORNEYS

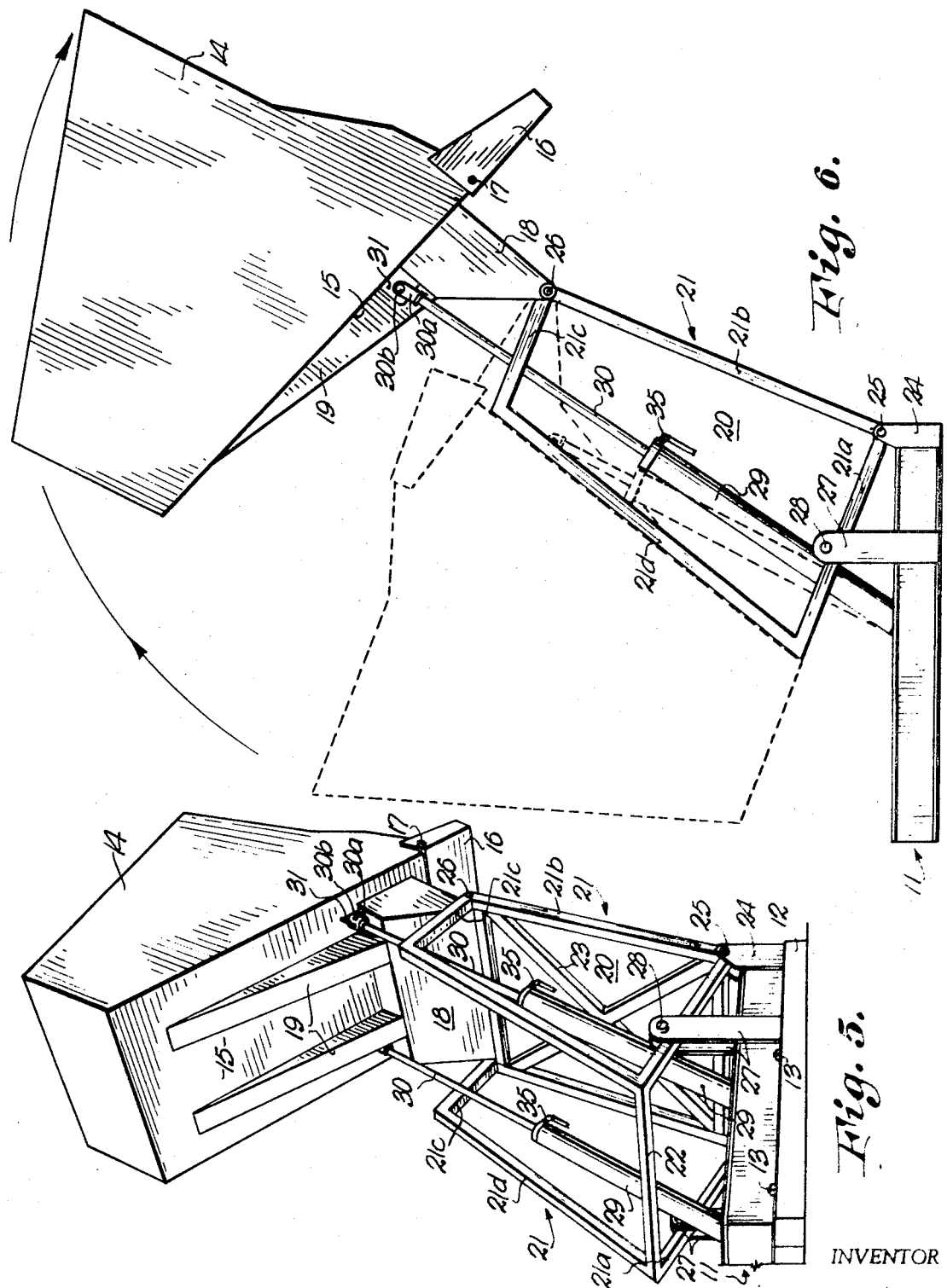

3,633,971

HYDRAULIC DUMP BOX

BACKGROUND AND SUMMARY OF THE INVENTION

The practice of mechanically dumping material contained in an open-topped box into a receiver from the side of a wagon or truck bed or the like is well known. In the art, this equipment is known as a "side dump box" and has utility in the field of agricultural materials handling. An example to which this invention relates is the dumping of fertilizer into the receiver of applicator equipment such as a fertilizer spreader.

A characteristic side dump box is pivotally connected near the uppermost end of its dumping side to a frame. The dumping operation is accomplished by rotatably elevating the bottom of the dump box above the frame-box pivot axis by means of a hydraulic cylinder.

In order to dump material into the receiver of a fertilizer spreader, the dumping edge of the box must extend past the truck bed and above the receiver. To achieve this position, a common feature in dump boxes is to slope the supporting frame outwardly from the truck bed which presents a safety hazard when the apparatus is being transported from one location to another. In addition, trucks having dump boxes of this type must be positioned in close proximity to the fertilizer spreader. Even with careful positioning, however, the dumped fertilizer tends to pile up at the rear of the receiver thus creating an unevenly distributed load.

One of the primary objects of the present invention is to provide a hydraulic dump box apparatus mounted entirely above a conventional truck bed. Since no protrusions extend over the truck bed, the dump box can be transported from one location to another without presenting a safety hazard. Likewise, the apparatus can be easily removed from the truck bed and thus free the truck for other useful functions.

An additional object of the invention is to provide a hydraulic dump box apparatus having a container and supporting frame which can be rotated outwardly from the truck bed to a tilt position. From this position, the bottom of the container can be rotatably elevated above the supporting frame to a dump position. Dumping from the tilt position has a twofold advantage. First, the truck need not be positioned in close proximity to the receiver as is necessary with other dump boxes. And second, the material can be dumped closely to the center of the receiver to provide an evenly distributed load.

Another object of the invention is to provide a hydraulic dump box apparatus which makes it possible to employ an aggregate, or even a single, hydraulic cylinder means for the purpose of moving the container and supporting frame to the tilt position and then rotating the container upwardly about the supporting frame to the dump position. The hydraulic cylinder means, in addition, is located in the interior of the apparatus rather than in a peripheral region in order to prevent damage to the cylinder connections and hoses caused by contact with foreign objects.

A further object of the invention is to provide a hydraulic dump box apparatus with an improved dumping container having a sloped dumping side which allows complete discharge of material when the container is in the dump position. The container is further improved by providing a dumping spout which folds out during the dumping operation and creates an extension to the dumping side of the container. Also, this feature cumulatively aids dumping from the tilt position by discharging material outwardly from the truck bed.

Other and further objects of the invention will appear in the course of the following description thereof.

DESCRIPTION OF THE DRAWINGS

In the drawings which form a part of the instant specification and are to be read in conjunction therewith, and in which like reference numerals indicate like parts in the various views:

FIG. 5 is a rear perspective view of the apparatus in the dump position; and

FIG. 6 is a side elevational view of the apparatus in the dump position and the broken line view indicates the tilt position.

Referring to FIGS. 1 and 2 of the drawings, the dumping apparatus is shown disposed on a wagon or truck bed 10 or the like. The rectangular base 11 of the dumping apparatus is preferably made from channel-shaped beams and is positioned above the truck bed 10 on support members 12. The base is securely attached with bolts 13 to the truck bed.

Figure 1:
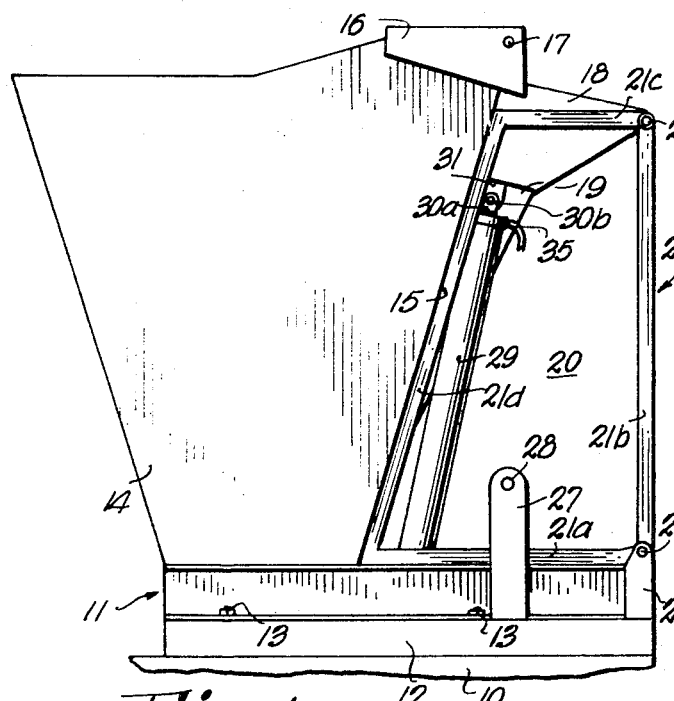
FIG. 1 is a side elevational view of the hydraulic dump box constructed in accordance with a preferred embodiment of the invention.
Figure 2:
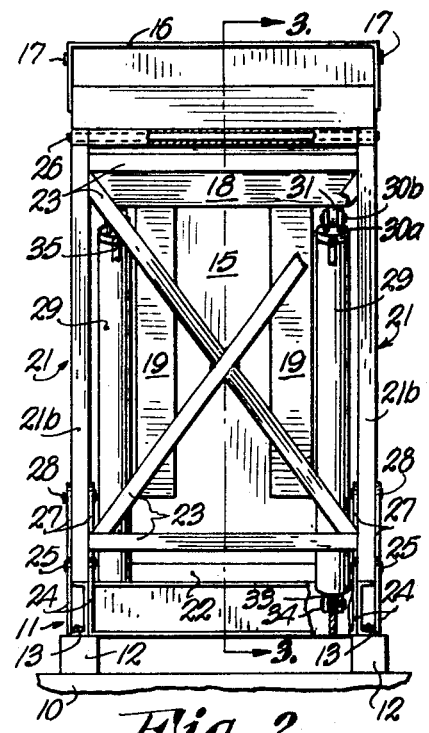
FIG. 2 is an end elevational view with portions broken away to show detail.
Figure 3:
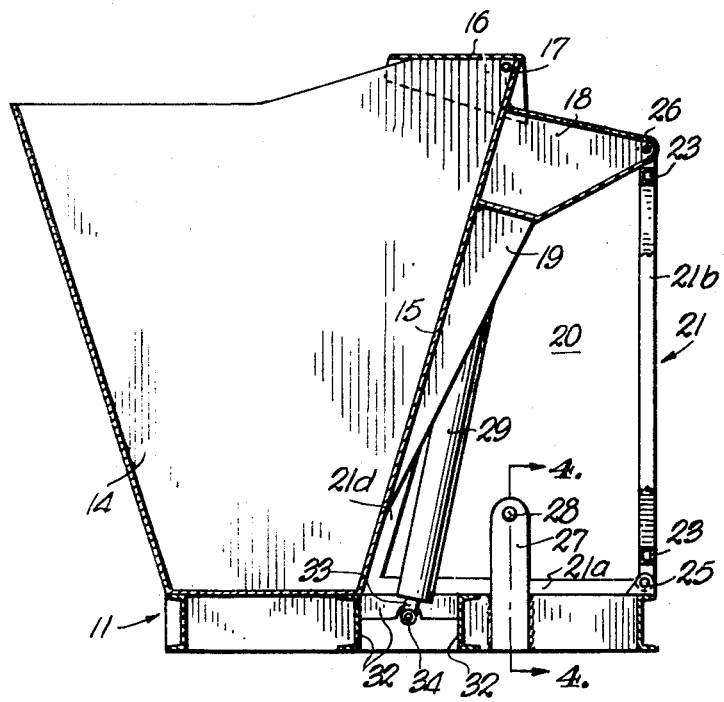
FIG. 3 is a sectional view along line 3—3 of FIG. 2 in the direction of the arrows.
Figure 4:
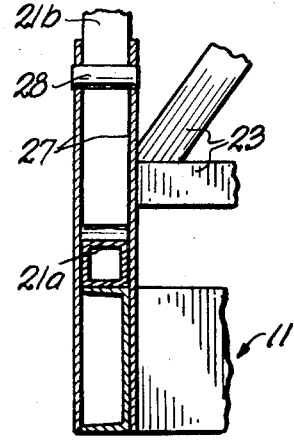
FIG. 4 is an enlarged sectional view along line 4—4 of FIG. 3 in the direction of the arrows.

Disposed on the rectangular base 11 in an upright, hopper-shaped, open-topped container 14, the inner sloped side 15 of which is the dumping side. At the uppermost edge of the dumping side 15 is located an elongated dumping spout 16 which is pivotally connected to the container 14 with pins 17. When the container 14 is in its upright position, as viewed in FIG. 1, the spout 16 partially covers the open top of the container 14. When the container 14 is in its dump position, as in FIG. 6, the spout 16 folds outwardly to create an extension of the sloped dumping side 15 of the container.

Extending outwardly in an approximate horizontal direction from the upper end of the dumping side 15 is a container arm 18 which terminates above the end of the rectangular base 11. A plurality of elongated triangular-shaped Gusset or Rib members 19 are attached to the under side of the arm 18 and to the dumping side 15 of the container to provide support between the arm 18 and the container 14.

Disposed on the rectangular base 11 adjacent the dumping side 15 of the container is an open supporting frame 20 preferably constructed from square tubing. The supporting frame 20 has two identical open sides 21 which are trapezoidal in shape, one of which is seen in FIG. 1. Of one such trapezoidal side 21 the bottom member 21a engages the rectangular base 11 from the bottom of the dumping side 15 of the container to the end of the base 11 opposite the container 14. A vertical member 21b which is rigidly attached to the bottom member 21a at the end of the base 11 opposite the container 14 extends upwardly to the end of the container arm 18 and substantially perpendicular to the base 11. The top member 21c is rigidly attached to the uppermost end of the vertical member 21b and extends to the dumping side 15 of the container and substantially parallel to the base 11. The sloped member 21d of the trapezoidal side 21 of the supporting frame rigidly connects the ends of the top member 21c and bottom member 21 a engaging the dumpside 14 of the container and engages throughout its length the vertical edge of the dumping side 15 of the container.

A horizontal member 22 rigidly connects the lowermost corners of the trapezoidal sides 21 engaging the container and engages the lowermost edge of the dumping side 15 of the container. The vertical members 21b of the trapezoidal sides are rigidly interconnected by cross braces 23.

At each corner of the rectangular base 11 opposite the container 14 are a pair of parallel upstanding ears 24 which form a U-shaped opening with the base 11 of sufficient width to receive the corners of the trapezoidal sides 21 of the supporting frame formed by the bottom members 21a and vertical members 21b. A pin 25 is placed through one of the ears 24 and passes through the supporting frame to the other ear 24 thus forming a pivot axis about which the supporting frame 20 can pivot with respect to the rectangular base 11.

Each corner of the trapezoidal sides 21 of the supporting frame formed by the vertical numbers 21b and the top members 21c is disposed alongside the outermost end of container arm 18 which terminates above the previously described frame-base pivot axis. A rod 26 is placed through one such corner of one trapezoidal side 21 and extends through the container arm 18 to such corner of the other trapezoidal side 21 thus forming a pivot axis about which the container 14 can rotate with respect to the supporting frame 20.

Also located on each side of the base 11 between the end opposite the container 14 and the dumping side 15 of the container are a pair of elongated parallel, upstanding ears 27 which form an elongated U-shaped opening with the base in which the bottom member 21a of the trapezoidal side of the supporting frame moves when the supporting frame 20 is rotated about its pivot axis. Connected between the uppermost ends of the ears 27 is a pin 28 which can engage the bottom member 21a of the trapezoidal side of the supporting frame and restrict the movement of said bottom member 21a to movement between the pin 28 and the rectangular base 11, thereby restricting the pivotal movement of the supporting frame 20.

Located near the dumping side 15 of the container and between the trapezoidal sides 21 of the supporting frame are two elongated hydraulic cylinders 29. Each hydraulic cylinder is equipped with a movable internal piston (not shown) which is fitted with an extension 30 projecting externally and upwardly from the hydraulic cylinder 29. The upper end of the extension 30 is equipped with a clevis 30a which is pivotally connected by a pin 30b to a lug 31 rigidly attached to the dumping side 15 of the container beneath the container arm 18. This type of connection allows pivotal movement of the container 14 with respect to the hydraulic cylinder 29.

The lower end of the hydraulic cylinder 29 extends beneath the bottom of the container 14 into the rectangular base 11 where it is pivotally anchored to transverse members 32 within the base 11 by clevis 33 and pin 34. The cylinder connection 35 provides access to the internal chamber of the hydraulic cylinder 29 and allows pressurized fluid to be introduced into the internal chamber through flexible hoses or the like.

In the preferred embodiment of the invention, two hydraulic cylinders 29 are employed. It should be understood that one such hydraulic cylinder centrally positioned could be employed in lieu of the aggregate arrangement to accomplish the same function.

In typical operation, the hydraulic dump box is utilized to dump material in the manner to be described.

The truck on which the hydraulic dump box apparatus is mounted is stopped behind a fertilizer spreader or other receiver. Pressurized fluid from a conventional pump and valved circuit (not shown) is introduced to the internal chamber of the hydraulic cylinder 29 through flexible hoses and cylinder connection 35. This causes extension 30 to move upwardly, thus forcing the container 14 and the supporting frame 20 to rotate outwardly from the truck bed 10 about the pivot axis formed by ears 24 and pins 25 until the bottom members 21a of the trapezoidal sides of the supporting frame engage the pins 28 of elongated ears 27. Since the container 14 is connected to the supporting frame 20 by container arm 18 and rod 26, the container is also carried to the tilt position as best viewed in the broken line view of FIG. 6 and supported on the dumping side 15 of the container by the sloped members 21b of the trapezoidal sides of the supporting frame.

As the extension 30 moves further upwardly, the container 14 is rotated about rod 26 which pivotally connects the container arm 14 to the supporting frame 20, the dumping spout 16 folds outwardly on pin 17 creating an extension of the dumping side 15, and material is dumped from the container 14 into the fertilizer spreader. When the pressure on the fluid in hydraulic cylinder 29 is reduced, the container 14 and supporting frame 20 return to their original position as viewed in FIG. 1.

When the container is in its upright position as viewed in FIG. 1, the hydraulic dump box apparatus is entirely contained above the truck bed and can be transported from one location to another without creating a safety hazard caused by protrusions over the side of the truck bed. Likewise, the apparatus can be easily removed from the truck bed by removing the bolts securing the rectangular base to the truck bed.

As viewed in FIG. 6, the dumping operation from the tilt position as well as the dumping spout indicates that material can be dumped outwardly from the truck bed and well into the fertilizer spreader to provide an evenly distributed load. In addition, the sloped dumping side of the container insures that the entire contents will be discharged when the container is extended to the dump position.

From the foregoing, it will be seen that this invention is one well adapted to attain all the ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described our invention, we claim:

1. A dumping apparatus comprising:
   a support base,
   an upright frame mounted near one edge of and on said base and extending upwardly therefrom,
   pivot means defining a base pivot axis and connecting said frame with said base for swinging movement of said frame about said base pivot axis from a first position above the base to an outwardly tilted position with respect to said base,
   cooperating means on said frame and base for limiting the permissible displacement of said frame to between said first and tilted positions, but permitting free movement between such positions,
   an open-topped, upright container having an upright wall forming a dumping side, said container located on said base adjacent to the frame when said frame is in said first position,
   arm means extending laterally from the upper end of said dumping side,
   pivot means connecting the outer end of said arm means with the upper end of said frame and defining a frame pivot axis located well above the base pivot axis, and
   extensible and retractable thrust means connected between said base and said container, said thrust means operable during the first phase of extension thereof to tilt the frame to said tilted position with the container resting thereon in a similarly tilted attitude and during a second phase to rotate the container about the frame pivot axis while the frame is in said tilted position, to a dumping position for the container.

2. A dumping apparatus as in claim 1, said thrust means comprising hydraulic cylinder means pivotally connected to said base and to the upper end of the dumping side of said container.

3. A dumping apparatus as in claim 1 said cooperating means having a frame-engaging member which is rigidly attached to said base, said cooperating means operable to engage said frame in said tilt position and thereby restrict outward rotation of said frame with respect to said base when said means rotates said container upwardly about said frame to said dump position.

* * * * *